(12) United States Patent
Xiong

(10) Patent No.: US 11,240,712 B2
(45) Date of Patent: Feb. 1, 2022

(54) DATA MIGRATION METHOD AND APPARATUS

(71) Applicant: HUAWEI TECHNOLOGIES CO., LTD., Guangdong (CN)

(72) Inventor: Wen Xiong, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 28 days.

(21) Appl. No.: 16/585,540

(22) Filed: Sep. 27, 2019

(65) Prior Publication Data
US 2020/0029254 A1 Jan. 23, 2020

Related U.S. Application Data

(63) Continuation of application No. PCT/CN2017/079120, filed on Mar. 31, 2017.

(51) Int. Cl.
H04B 7/216 (2006.01)
H04W 36/00 (2009.01)
H04W 36/08 (2009.01)
H04W 80/06 (2009.01)

(52) U.S. Cl.
CPC ... *H04W 36/0033* (2013.01); *H04W 36/0016* (2013.01); *H04W 36/08* (2013.01); *H04W 80/06* (2013.01)

(58) Field of Classification Search
CPC ......... H04W 36/0016; H04W 36/0055; H04W 36/0069; H04W 36/04; H04W 36/0038; H04W 36/0077

USPC .............. 370/331, 315, 338, 394, 466, 340
See application file for complete search history.

(56) References Cited

U.S. PATENT DOCUMENTS

| 9,648,528 | B2* | 5/2017 | Lee ................... H04W 36/0033 |
| 2007/0005787 | A1 | 1/2007 | Igarashi et al. |
| 2011/0223919 | A1 | 9/2011 | Vikberg et al. |
| 2012/0182971 | A1 | 7/2012 | Ohta et al. |
| 2014/0064249 | A1* | 3/2014 | Lee ................... H04W 36/0033 370/331 |
| 2015/0109999 | A1 | 4/2015 | Godin |

(Continued)

FOREIGN PATENT DOCUMENTS

| CN | 101330451 A | 12/2008 |
| CN | 101489270 A | 7/2009 |

(Continued)

*Primary Examiner* — Joseph Arevalo
(74) *Attorney, Agent, or Firm* — Womble Bond Dickinson (US) LLP

(57) ABSTRACT

A data migration method is disclosed. The method includes: performing, by a source base station, a TCP proxy for user equipment; learning, by the source base station, that the user equipment is to be handed over to a target base station; sending, by the source base station to the target base station, context information including a sequence number of a data packet, and the sequence number of the data packet is a largest sequence number of data packets that have been acknowledged by the user equipment or a smallest sequence number of data packets that have not been acknowledged by the user equipment; and migrating, by the source base station by using the SCTP, the data packets that have not been acknowledged by the user equipment to the target base station.

12 Claims, 6 Drawing Sheets

(56) References Cited

U.S. PATENT DOCUMENTS

| | | | |
|---|---|---|---|
| 2015/0208283 A1* | 7/2015 | Yang | H04W 36/04 370/331 |
| 2015/0296418 A1 | 10/2015 | Szilagyi et al. | |
| 2017/0041836 A1 | 2/2017 | Huang et al. | |

FOREIGN PATENT DOCUMENTS

| CN | 101653027 A | 2/2010 |
|---|---|---|
| CN | 103118403 A | 5/2013 |
| CN | 104077401 A | 10/2014 |
| CN | 104285472 A | 1/2015 |

\* cited by examiner

DATA MIGRATION METHOD AND APPARATUS

CROSS-REFERENCE TO RELATED APPLICATIONS

This application is a continuation of International Application No. PCT/CN2017/079120, filed on Mar. 31, 2017, the disclosure of which is hereby incorporated by reference in its entirety.

TECHNICAL FIELD

The disclosure relates to the communications field, and in particular, to a data migration method and an apparatus.

BACKGROUND

The transmission control protocol (TCP) is a byte stream-based transport layer communication protocol. After a TCP connection is established between user equipment (UE) and a server, the server sends a downlink TCP data packet to the UE by using an evolved NodeB (ENB). After receiving the downlink TCP data packet, the UE returns a TCP acknowledgment (TCP ACK) to the server by using the eNB. The eNB only serves as a transmission channel and does not perform any processing at a transport layer. When a TCP proxy is added to the eNB, the TCP connection between the UE and the server is divided into a TCP connection between the server and the TCP proxy and a TCP connection between the UE and the TCP proxy. The downlink TCP data packet sent by the server to the UE is first cached by the TCP proxy on the eNB. After correctly receiving the downlink TCP data packet, the TCP proxy returns a TCP ACK to the server, and sends the cached downlink TCP data packet to the UE. After correctly receiving the downlink TCP data packet, the UE returns a TCP ACK to the eNB. The TCP connection between the server and the TCP proxy and the TCP connection between the UE and the TCP proxy are independent of each other and are not sensed by the UE.

However, when the TCP proxy is added to the eNB, when the UE is handed over between base stations, a TCP connection is easily broken, and service interruption is caused. For example, as shown in FIG. 1, before handover: 1. A server sends data packets (1, 2, 3, 4) to a TCP proxy on a source eNB. 2. The TCP proxy on the source eNB correctly receives the data packets (1, 2, 3, 4) and acknowledges the data packets (1, 2, 3, 4) to the server, and then the server deletes the data packets (1, 2, 3, 4). 3. The source eNB sends data packets (1, 2) to UE. 4. The UE correctly receives the data packets (1, 2), and acknowledges the received data packets (1, 2) to the source eNB. During the handover, data packets (3, 4) cached in the TCP proxy on the source eNB are not migrated to a target eNB. After the handover: 5. The server sends data packets (5, 6) to the UE. 6. Because the UE does not receive the data packets (3, 4), the UE sends consecutive TCP ACKs to the server. To be specific, when receiving a data packet (5) from the server, the UE sends a TCP ACK to the server, to notify the server that a data packet after a data packet (2) has not been received. When receiving a data packet (6) from the server, the UE continues to send a TCP ACK to the server, to notify the server that a data packet after a data packet (2) has not been received. Because the server side has discarded data packets after the data packet (2), namely, the data packets (3, 4), the server side cannot retransmit the data packets (3, 4) to the UE. Consequently, a TCP connection between the server and the UE is broken, and service interruption is caused.

SUMMARY

Embodiments of the disclosure provide a data migration method and an apparatus, to resolve a problem that a TCP connection is broken due to packet loss of a data packet.

According to one aspect, an embodiment of the disclosure provides a data migration method, including: performing, by a source base station, a TCP proxy for user equipment; learning, by the source base station, that the user equipment is to be handed over to a target base station; sending, by the source base station, context information to the target base station, where the context information includes a sequence number of a data packet, and the sequence number of the data packet is a largest sequence number of data packets that have been acknowledged by the user equipment or a smallest sequence number of data packets that have not been acknowledged by the user equipment; and migrating, by the source base station by using the stream control transmission protocol (SCTP), the data packets that have not been acknowledged by the user equipment to the target base station, so that the target base station receives, based on the sequence number of the data packet, the data packets that have not been acknowledged by the user equipment. In this way, when the source base station performs the TCP proxy for the user equipment, if the user equipment is handed over between base stations, the source base station may send the context information to the target base station, so that the target base station receives, based on the context information, the data packets that have not been acknowledged by the user equipment. Compared with the prior art in which during handover of a TCP proxy, a TCP connection between a server and user equipment is broken due to packet loss on the server side, in this embodiment of the disclosure, the source base station may migrate a data packet to the target base station by using SCTP to avoid packet loss of the data packet, thereby resolving a problem that a TCP connection is broken due to the packet loss.

In one embodiment, the method further includes: sending, by the source base station, a handover request to the target base station, where the handover request includes a first information element, and the first information element is used to indicate that the source base station performs the TCP proxy for the user equipment; and receiving, by the source base station, a handover request response message from the target base station, where the handover request response message includes a second information element, and the second information element is used to indicate whether the target base station is capable of allocating a TCP proxy resource to the user equipment. For example, a bit value 1 of the second information element may indicate that the target base station is capable of allocating the TCP proxy resource to the user equipment. A bit value 0 of the second information element may indicate that the target base station is incapable of allocating the TCP proxy resource to the user equipment.

In one embodiment, if the second information element indicates that the target base station is capable of allocating the TCP proxy resource to the user equipment, the context information further includes context information of establishing the TCP proxy, so that the target base station maintains the TCP proxy for the user equipment based on the context information of the TCP proxy. In this way, the target base station can maintain the TCP proxy for the user equipment based on the context information, to maintain continuity of the TCP proxy before and after handover, thereby improving user experience.

In one embodiment, the sending, by the source base station, context information to the target base station includes: sending, by the source base station, status transfer signaling to the target base station, where the status transfer signaling includes the context information. In other words, the source base station may send the context information to the target base station by sending the status transfer signaling to the target base station.

In one embodiment, the migrating, by the source base station by using the stream control transmission protocol SCTP, the data packets that have not been acknowledged by the user equipment to the target base station includes: encapsulating, by the source base station by using the X2 interface application protocol and SCTP, the data packets that have not been acknowledged by the user equipment; and sending, by the source base station, a handover data message to the target base station, where the handover data message includes the data packets that have not been acknowledged by the user equipment and a message type indication that are encapsulated by the source base station by using the X2 interface application protocol and SCTP, and the message type indication is used to indicate that the source base station migrates the data packets that have not been acknowledged by the user equipment to the target base station. After receiving the handover data message sent by the source base station, the target base station may decapsulate the data by using SCTP and the X2-AP interface protocol, to obtain the data packets that have not been acknowledged by the user equipment and that are sent by the source base station.

According to another aspect, a data migration method is provided, including: receiving, by a target base station, context information from a source base station, where the context information includes a sequence number of a data packet, and the sequence number of the data packet is a largest sequence number of data packets that have been acknowledged by user equipment or a smallest sequence number of data packets that have not been acknowledged by the user equipment; and receiving, by the target base station, from the source base station based on the sequence number of the data packet, the data packets that have not been acknowledged by the user equipment and that are migrated by using the stream control transmission protocol SCTP. In this way, the target base station may receive the context information from the source base station, and may receive, based on the context information, the data packets that have not been acknowledged by the user equipment from the source base station. Compared with the prior art in which during handover of a TCP proxy, a TCP connection between a server and user equipment is broken due to packet loss on the server side, in this embodiment of the disclosure, the target base station may receive a data packet from the source base station by using SCTP to avoid packet loss of the data packet, thereby resolving a problem that a TCP connection is broken due to the packet loss.

In one embodiment, the method further includes: receiving, by the target base station, a handover request from the source base station, where the handover request includes a first information element, and the first information element is used to indicate that the source base station performs a TCP proxy for the user equipment; determining, by the target base station based on a capability of the target base station, whether the target base station can maintain the TCP proxy for the user equipment; and sending, by the target base station, a handover request response message to the source base station, where the handover request response message includes a second information element, and the second information element is used to indicate whether the target base station is capable of allocating a TCP proxy resource to the user equipment. For example, a bit value 1 of the second information element may indicate that the target base station is capable of allocating the TCP proxy resource to the user equipment. A bit value 0 of the second information element may indicate that the target base station is incapable of allocating the TCP proxy resource to the user equipment.

In one embodiment, if the second information element indicates that the target base station is capable of allocating the TCP proxy resource to the user equipment, the context information further includes context information of establishing the TCP proxy; and the target base station maintains the TCP proxy for the user equipment based on the context information of the TCP proxy. In this way, the target base station can maintain the TCP proxy for the user equipment based on the context information, to maintain continuity of the TCP proxy before and after handover between the base stations, thereby improving user experience.

In one embodiment, the receiving, by a target base station, context information from a source base station includes: receiving, by the target base station, status transfer signaling from the source base station, where the status transfer signaling includes the context information. In other words, the target base station may receive the context information by receiving the status transfer signaling from the source base station.

In one embodiment, the receiving, by the target base station, from the source base station based on the sequence number of the data packet, the data packets that have not been acknowledged by the user equipment and that are migrated by using the stream control transmission protocol SCTP includes: receiving, by the target base station, a handover data message from the source base station, where the handover data message includes the data packets that have not been acknowledged by the user equipment and a message type indication, and the message type indication is used to indicate that the target base station receives the data packets that have not been acknowledged by the user equipment from the source base station; and decapsulating, by the target base station, the handover data message by using the X2 interface application protocol and SCTP, to obtain the data packets that have not been acknowledged by the user equipment.

According to still another aspect, a source base station is provided, and includes: a processing unit, configured to perform a TCP proxy for user equipment, where the processing unit is further configured to learn that the user equipment is to be handed over to a target base station; and a sending unit, configured to send context information to the target base station, where the context information includes a sequence number of a data packet, and the sequence number of the data packet is a largest sequence number of data packets that have been acknowledged by the user equipment or a smallest sequence number of data packets that have not been acknowledged by the user equipment, where the sending unit is further configured to migrate, by using SCTP, the data packets that have not been acknowledged by the user equipment to the target base station, so that the target base station receives, based on the sequence number of the data packet, the data packets that have not been acknowledged by the user equipment.

In one embodiment, the sending unit is further configured to send a handover request to the target base station, where the handover request includes a first information element, and the first information element is used to indicate that the source base station performs the TCP proxy for the user equipment; and the source base station further includes a receiving unit, configured to receive a handover request response message from the target base station, where the handover request response message includes a second information element, and the second information element is used to indicate whether the target base station is capable of allocating a TCP proxy resource to the user equipment.

In one embodiment, if the second information element indicates that the target base station is capable of allocating the TCP proxy resource to the user equipment, the context information further includes context information of establishing the TCP proxy, so that the target base station maintains the TCP proxy for the user equipment based on the context information of the TCP proxy.

In one embodiment, the sending unit is configured to send status transfer signaling to the target base station, where the status transfer signaling includes the context information.

In one embodiment, the processing unit is further configured to encapsulate, by using the X2 interface application protocol and SCTP, the data packets that have not been acknowledged by the user equipment; and the sending unit is configured to send a handover data message to the target base station, where the handover data message includes the data packets that have not been acknowledged by the user equipment and a message type indication that are encapsulated by the source base station by using the X2 interface application protocol and SCTP, and the message type indication is used to indicate that the source base station migrates the data packets that have not been acknowledged by the user equipment to the target base station.

According to still another aspect, a target base station is provided, and includes: a receiving unit, configured to receive context information from a source base station, where the context information includes a sequence number of a data packet, and the sequence number of the data packet is a largest sequence number of data packets that have been acknowledged by user equipment or a smallest sequence number of data packets that have not been acknowledged by the user equipment; and a processing unit, configured to receive, from the source base station based on the sequence number of the data packet by using the receiving unit, the data packets that have not been acknowledged by the user equipment and that are migrated by using SCTP.

In one embodiment, the receiving unit is further configured to receive a handover request from the source base station, where the handover request includes a first information element, and the first information element is used to indicate that the source base station performs a TCP proxy for the user equipment; the processing unit is further configured to determine, based on a capability of the target base station, whether the target base station can maintain the TCP proxy for the user equipment; and the target base station further includes a sending unit, configured to send a handover request response message to the source base station, where the handover request response message includes a second information element, and the second information element is used to indicate whether the target base station is capable of allocating a TCP proxy resource to the user equipment.

In one embodiment, if the second information element indicates that the target base station is capable of allocating the TCP proxy resource to the user equipment, the context information further includes context information of establishing the TCP proxy; and the processing unit is further configured to maintain the TCP proxy for the user equipment based on the context information of the TCP proxy.

In one embodiment, the receiving unit is configured to receive status transfer signaling from the source base station, where the status transfer signaling includes the context information.

In one embodiment, the receiving unit is configured to receive a handover data message from the source base station, where the handover data message includes the data packets that have not been acknowledged by the user equipment and a message type indication, and the message type indication is used to indicate that the target base station receives the data packets that have not been acknowledged by the user equipment from the source base station; and the processing unit is configured to decapsulate the handover data message by using the X2 interface application protocol and SCTP, to obtain the data packets that have not been acknowledged by the user equipment.

According to still another aspect, a source base station is provided, and includes: a processor, configured to perform a transmission control protocol TCP proxy for user equipment, where the processor is further configured to learn that the user equipment is to be handed over to a target base station; and a transceiver, configured to send context information to the target base station, where the context information includes a sequence number of a data packet, and the sequence number of the data packet is a largest sequence number of data packets that have been acknowledged by the user equipment or a smallest sequence number of data packets that have not been acknowledged by the user equipment, where the transceiver is further configured to migrate, by using the stream control transmission protocol SCTP, the data packets that have not been acknowledged by the user equipment to the target base station, so that the target base station receives, based on the sequence number of the data packet, the data packets that have not been acknowledged by the user equipment.

In one embodiment, the transceiver is further configured to: send a handover request to the target base station, where the handover request includes a first information element, and the first information element is used to indicate that the source base station performs the TCP proxy for the user equipment; and receive a handover request response message from the target base station, where the handover request response message includes a second information element, and the second information element is used to indicate whether the target base station is capable of allocating a TCP proxy resource to the user equipment.

In one embodiment, if the second information element indicates that the target base station is capable of allocating the TCP proxy resource to the user equipment, the context information further includes context information of establishing the TCP proxy, so that the target base station maintains the TCP proxy for the user equipment based on the context information of the TCP proxy.

In one embodiment, the transceiver is configured to send status transfer signaling to the target base station, where the status transfer signaling includes the context information.

In one embodiment, the processor is further configured to encapsulate, by using the X2 interface application protocol and SCTP, the data packets that have not been acknowledged by the user equipment; and the transceiver is configured to send a handover data message to the target base station, where the handover data message includes the data packets that have not been acknowledged by the user equipment and a message type indication that are encapsulated by the source base station by using the X2 interface application protocol and SCTP, and the message type indication is used to indicate that the source base station migrates the data packets that have not been acknowledged by the user equipment to the target base station.

According to still another aspect, a target base station is provided, and includes: a transceiver, configured to receive context information from a source base station, where the context information includes a sequence number of a data packet, and the sequence number of the data packet is a largest sequence number of data packets that have been acknowledged by user equipment or a smallest sequence number of data packets that have not been acknowledged by the user equipment; and a processor, configured to receive, from the source base station based on the sequence number of the data packet by using the transceiver, the data packets that have not been acknowledged by the user equipment and that are migrated by using the stream control transmission protocol SCTP.

In one embodiment, the transceiver is further configured to receive a handover request from the source base station, where the handover request includes a first information element, and the first information element is used to indicate that the source base station performs a TCP proxy for the user equipment; the processor is further configured to determine, based on a capability of the target base station, whether the target base station can maintain the TCP proxy for the user equipment; and the transceiver is further configured to send a handover request response message to the source base station, where the handover request response message includes a second information element, and the second information element is used to indicate whether the target base station is capable of allocating a TCP proxy resource to the user equipment.

In one embodiment, if the second information element indicates that the target base station is capable of allocating the TCP proxy resource to the user equipment, the context information further includes context information of establishing the TCP proxy; and the processor is further configured to maintain the TCP proxy for the user equipment based on the context information of the TCP proxy.

In one embodiment, the transceiver is configured to receive status transfer signaling from the source base station, where the status transfer signaling includes the context information.

In one embodiment, the transceiver is configured to receive a handover data message from the source base station, where the handover data message includes the data packets that have not been acknowledged by the user equipment and a message type indication, and the message type indication is used to indicate that the target base station receives the data packets that have not been acknowledged by the user equipment from the source base station; and the processor is configured to decapsulate the handover data message by using the X2 interface application protocol and SCTP, to obtain the data packets that have not been acknowledged by the user equipment.

According to still another aspect, an embodiment of the disclosure provides a computer storage medium, configured to store a computer software instruction used by the foregoing source base station. The computer software instruction includes a program designed for performing the foregoing aspects.

According to still another aspect, an embodiment of the disclosure provides a computer storage medium, configured to store a computer software instruction used by the foregoing target base station. The computer software instruction includes a program designed for performing the foregoing aspects.

In this way, when the source base station performs the TCP proxy for the user equipment, if the user equipment is handed over between base stations, the source base station may send the context information to the user equipment, where the context information includes the sequence number of the data packet, and then migrate, by using SCTP, the data packets that have not been acknowledged by the user equipment to the target base station, so that the target base station receives, based on the sequence number of the data packet, the data packets that have not been acknowledged by the user equipment and that are migrated by the source base station. Compared with the prior art in which a TCP connection is broken due to packet loss of a data packet, in this embodiment of the disclosure, packet loss of a data packet can be avoided during handover of the TCP proxy, thereby resolving a problem that a TCP connection is broken due to the packet loss of the data packet.

DESCRIPTION OF EMBODIMENTS

The embodiments of the disclosure may be applied to a scenario in which base stations migrate data in a TCP proxy handover process. The TCP proxy handover is a process in which user equipment is handed over between the base stations when a source base station performs a TCP proxy for the user equipment. For example, the disclosure may be applied to a scenario in which data cached in the TCP proxy on the source base station is migrated to a target base station in an X2 handover process. The TCP proxy may be configured to cache data packets (for example, TCP data packets) of the user equipment and a service server, to effectively improve end-to-end transmission bandwidth of a system. It should be noted that the embodiments of the disclosure may be applied to a scenario in which a serving gateway (SGW) changes in an X2 handover process, or may be applied to a scenario in which an SGW does not change in an X2 handover process. This is not limited in the embodiments of the disclosure.

Figure 1:
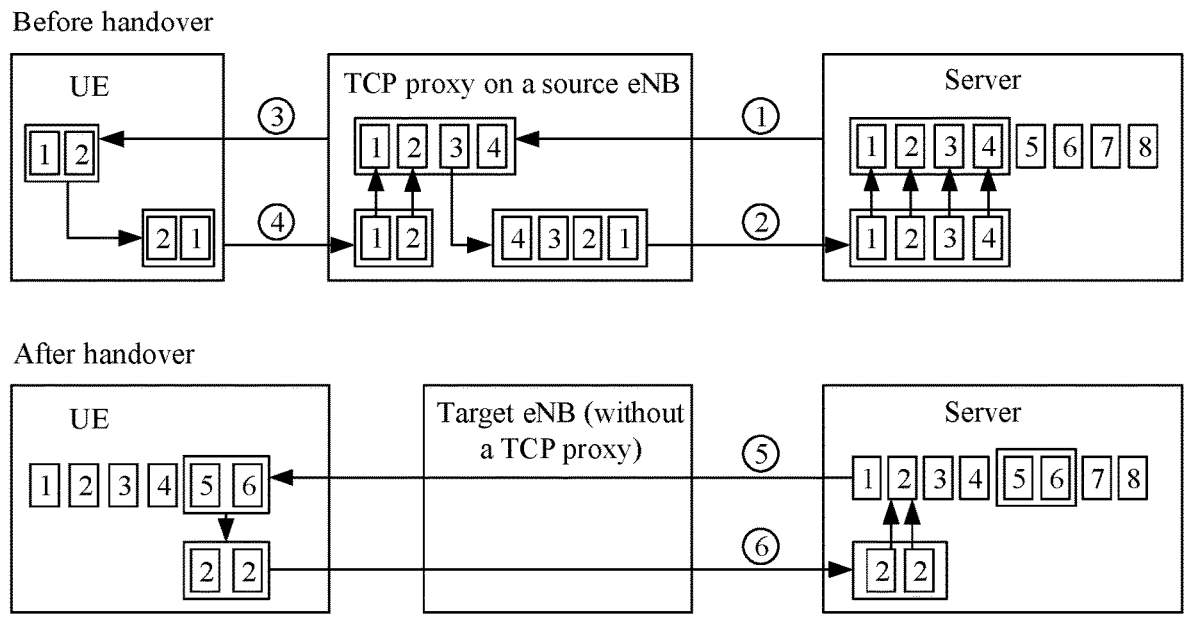
FIG. 1 is a schematic diagram of statuses of data packets existing before and after handover when a source eNB performs a TCP proxy for user equipment according to an embodiment of the disclosure.
Figure 2:
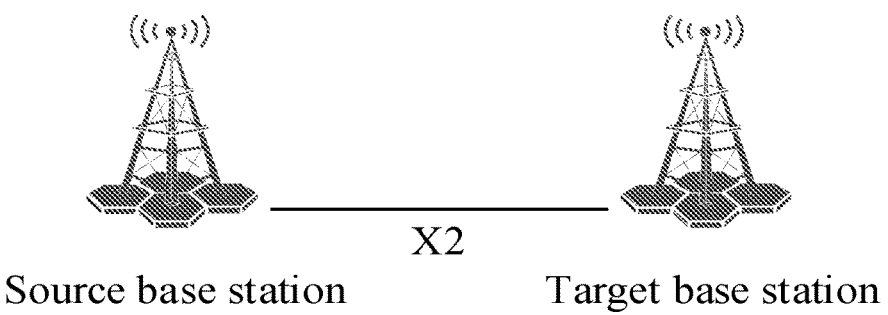
FIG. 2 is a diagram of a system architecture of a source base station and a target base station according to an embodiment of the disclosure.

As shown in FIG. 2, a system architecture in an embodiment of the disclosure may include a source base station and a target base station. The source base station and the target base station may be eNBs, and an interconnection interface between the source base station and the target base station may be an X2 interface. In addition, another future-oriented communications system may be further applied to the disclosure. Base stations may have other names, and an interface between the base stations may also be another interface. The source base station may be configured to: send context information to the target base station, and migrate a data packet that has not been acknowledged by user equipment to the target base station. The target base station may be configured to: receive the context information from the source base station, and receive the data packet that has not been acknowledged by the user equipment from the source base station.

Figure 3:
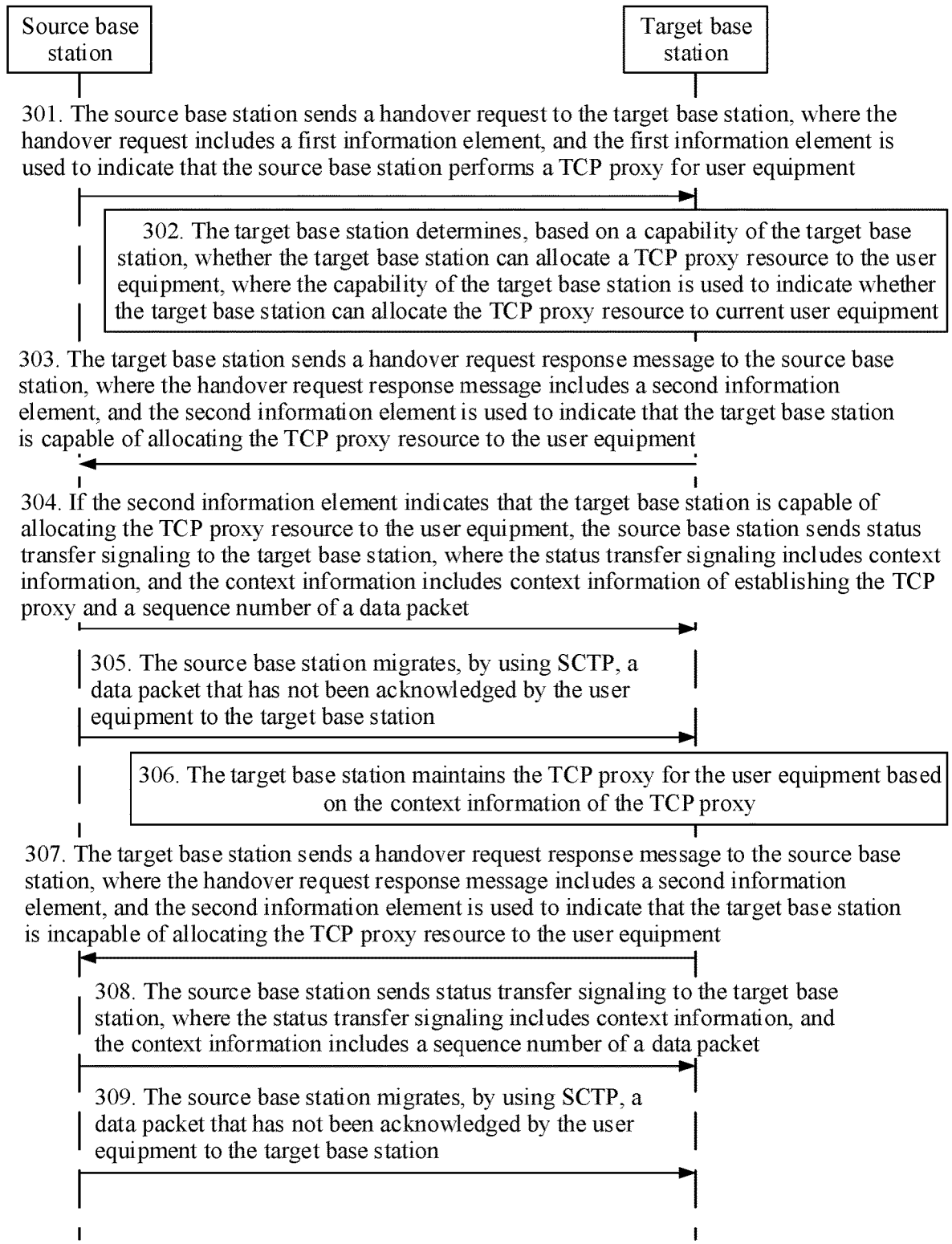
FIG. 3 is a schematic diagram of a data migration method according to an embodiment of the disclosure.

An embodiment of the disclosure provides a data migration method. As shown in FIG. 3, the method includes the following operations.

Operation 301. A source base station sends a handover request to a target base station, where the handover request includes a first information element, and the first information element is used to indicate that the source base station performs a TCP proxy for user equipment.

When the source base station performs the TCP proxy for the user equipment, when the user equipment needs to be handed over between base stations, the user equipment sends a measurement report to the source base station, so that the source base station learns that the user equipment is to be handed over to the target base station. The source base station may determine, based on the measurement report reported by the user equipment, to hand over the TCP proxy. In addition, the source base station may send the handover request to the target base station through an X2 interface to request the target base station to prepare for handover.

The first information element in the handover request may be a TCP proxy handover (Handover With Tcp Proxy) information element, and is used to indicate that the source base station performs the TCP proxy for the user equipment before the user equipment is handed over. If the source base station performs the TCP proxy for the user equipment, when the user equipment and a service server perform data transmission with each other, the source base station may cache, by using the TCP proxy, a data packet sent by the service server to the user equipment or a data packet sent by the user equipment to the service server. Specifically, the downlink TCP data packet sent by the service server to the user equipment may be first cached by the TCP proxy on the source base station. After correctly receiving the downlink TCP data packet, the TCP proxy returns an acknowledgment message to the service server, and sends the cached downlink TCP data packet to the user equipment. After receiving the acknowledgment message sent by the TCP proxy, the service server deletes a corresponding data packet. After correctly receiving the downlink TCP data packet, the user equipment may return an acknowledgment message to the source base station.

In one embodiment, the TCP proxy handover information element may be further used to indicate whether the target base station is capable of performing the TCP proxy for the user equipment. In other words, the TCP proxy handover information element may be further used to indicate whether the target base station can continue to provide a TCP proxy function for the user equipment, in other words, maintain the TCP proxy for the user equipment.

In one embodiment, the TCP proxy handover information element may be used to indicate whether the source base station performs the TCP proxy for the user equipment. If the source base station can perform the TCP proxy for the user equipment, a bit value of the TCP proxy handover information element may be 1. If the source base station cannot perform the TCP proxy for the user equipment, a bit value of the TCP proxy handover information element may be 0. In this case, the source base station and the target base station do not need to hand over the TCP proxy.

After receiving the handover request, if the target base station reads that the handover request includes the first information element, the target base station may perform operation 302.

Operation 302. The target base station determines, based on a capability of the target base station, whether the target base station can allocate a TCP proxy resource to the user equipment, where the capability of the target base station is used to indicate whether the target base station can allocate the TCP proxy resource to current user equipment.

The capability of the target base station may include whether the target base station has a TCP proxy function and a processing capability of the target base station.

For example, if the target base station can allocate TCP proxy resources to N user equipments, and a current target base station allocates TCP proxy resources only to no more than N user equipments, it is considered that the target base station has the processing capability. When the target base station has the TCP proxy function and the processing capability, the target base station determines that the target base station can allocate a proxy resource to user equipment that is currently to be handed over. If the target base station does not have the TCP proxy function, or the target base station can allocate TCP proxy resources to N user equipments, but a current target base station has allocated the proxy resources to the N user equipments, it is considered that the target base station does not have the processing capability. In this case, the target base station cannot allocate a proxy resource to user equipment that is currently to be handed over.

If the target base station is capable of allocating the TCP proxy resource to the current user equipment, the target base station performs operations 303 to 306. If the target base station is incapable of allocating the TCP proxy resource to the current user equipment, the target base station performs operations 307 to 309.

Operation 303. The target base station sends a handover request response (Handover Request Acknowledge) message to the source base station, where the handover request response message includes a second information element, and the second information element is used to indicate that the target base station is capable of allocating the TCP proxy resource to the user equipment.

In other words, after determining that the target base station can allocate the TCP proxy resource to the user equipment and prepare for handover between base stations, the target base station may send the handover request response message to the source base station. The second information element included in the handover request response message may be referred to as an information element for a TCP proxy after handover (Tcp Proxy After Handover).

For example, a bit value 1 of the second information element may indicate that the target base station is capable of allocating the TCP proxy resource to the user equipment.

Operation 304. The source base station sends status transfer signaling to the target base station, where the status transfer signaling includes context information, and the context information includes context information of establishing the TCP proxy and a sequence number of a data packet.

After receiving the handover request response message sent by the target base station, the source base station reads the second information element and determines that the target base station is capable of allocating the TCP proxy resource to the user equipment, and then the source base station may send the status transfer signaling to the target base station. The status transfer signaling may be sequence number status transfer (SN Status Transfer) signaling, and may be used to carry a sequence number of a service data unit (SDU) data packet of a packet data convergence protocol (PDCP) stack in the source base station. The context information may be context information of a TCP proxy before handover.

The context information of the TCP proxy may include four-tuple information or five-tuple information of a TCP service flow between a terminal and a service server. For example, the four-tuple information may include an IP address, a source port, a destination IP address, and a destination port. The five-tuple information may further include a transmission protocol based on the four-tuple information, and the transmission protocol may include SCTP, TCP, or the like. This is not limited in the disclosure.

For example, 192.168.1.1, 10000, SCTP, 121.14.88.76, and 80 may constitute one piece of five-tuple information. This means that a terminal with an IP address of 192.168.1.1 is connected, by using a port 10000 and the SCTP protocol, to a service server with an IP address of 121.14.88.76 and a port 80.

The sequence number of the data packet may include a largest sequence number of data packets that have been acknowledged by the user equipment for the source base station or a smallest sequence number of acknowledgment data packets that have not been acknowledged by the user equipment for the source base station.

For example, if the user equipment and the service server perform data transmission with each other by using the TCP proxy on the source base station before the user equipment is handed over between base stations, the service server may first send data packets (1, 2, 3, 4) to the TCP proxy on the source base station. After correctly receiving the data packets (1, 2, 3, 4), the TCP proxy on the source base station may acknowledge the data packets (1, 2, 3, 4) to the service server, and then the service server deletes the data packets (1, 2, 3, 4). Then, the TCP proxy on the source base station sends data packets (1, 2) to the user equipment. After correctly receiving the data packets (1, 2), the user equipment may acknowledge the data packets (1, 2) to the source base station. The data packets (1, 2, 3, 4) separately include a plurality of byte stream-based data packets (data segments), and each data segment may correspond to one sequence number. If a data packet 1 includes 10 data segments whose sequence numbers are 1 to 10, a data packet 2 includes 15 data segments whose sequence numbers are 11 to 25, and a data packet 3 includes 20 data segments whose sequence numbers are 26 to 45, in this case, the largest sequence number of the data packets that have been acknowledged by the user equipment for the source base station may be 25, the smallest sequence number of the acknowledgment data packets that have not been acknowledged by the user equipment for the source base station may be 26.

Operation 305. The source base station migrates, by using SCTP, a data packet that has not been acknowledged by the user equipment to the target base station.

SCTP is a connection-oriented stream transmission protocol, and may be used to provide a stable and ordered data transmission service between two base stations (endpoints). Migrating the data packet by using STCP may ensure that the data packet can be completely migrated from the source base station to the target base station in a TCP proxy handover scenario.

In one embodiment, the source base station may migrate, by sending a handover data message to the target base station, the data packet that has not been acknowledged by the user equipment to the target base station.

The handover data message may include the data packet that has not been acknowledged by the user equipment and a message type indication, and the message type indication may indicate that the handover data message is used by the source base station to migrate the data packet that has not been acknowledged by the user equipment to the target base station.

Based on the example in operation 304, the data packets that have not been acknowledged by the user equipment may be data packets (3, 4).

Figure 4:
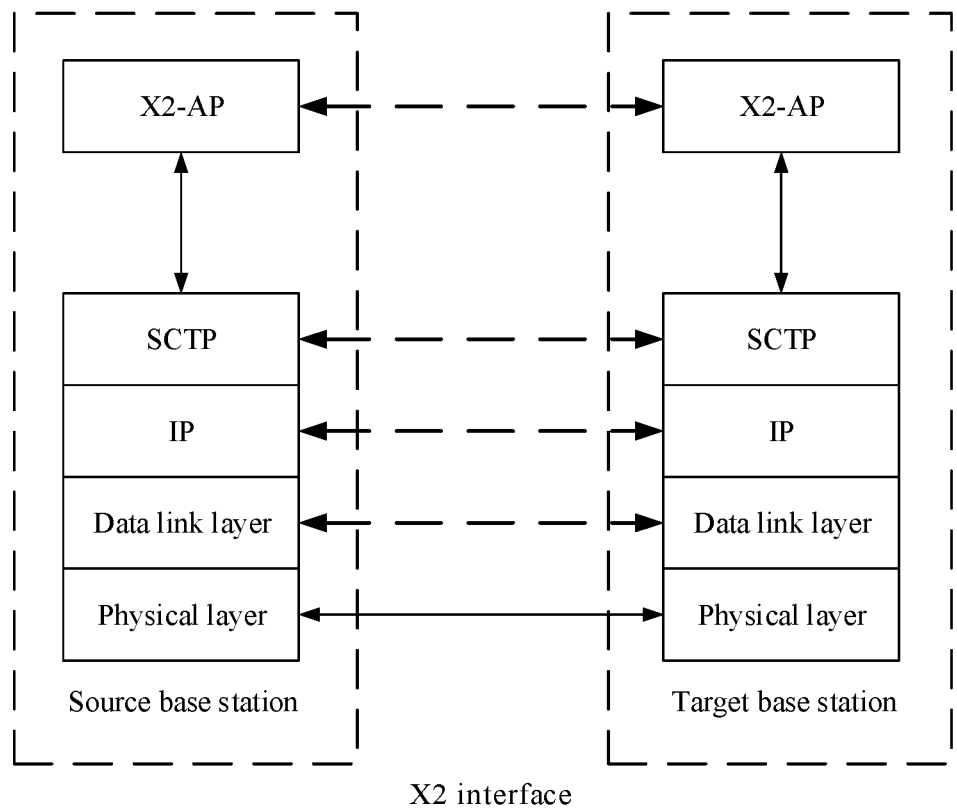
FIG. 4 is a schematic diagram of a method in which a source base station migrates data by using SCTP according to an embodiment of the disclosure.

As shown in FIG. 4, a process in which the source base station migrates, by using SCTP, the data packet that has not been acknowledged by the user equipment to the target base station by using the SCTP may be as follows:

1. The source base station encapsulates, by using the X2-AP interface protocol, the data packet that has not been acknowledged by the user equipment, and adds the message type indication to the data packet. For example, the source base station may select a byte combination that is not specified in the X2-AP interface protocol as the message type indication, to indicate that the handover data message is used by the source base station to migrate the data packet that has not been acknowledged by the user equipment to the target base station.

2. The source base station continues to encapsulate, by using SCTP, the data packet that has been encapsulated by using the X2-AP interface protocol.

3. The source base station continues to encapsulate the data packet by using the IP protocol, a data link layer protocol, and a physical layer protocol.

4. The source base station sends, to the target base station through a control plane interface (namely, an X2-C interface) in an X2 interface, the handover data message including the message type indication and the data packet that has not been acknowledged.

Certainly, the source base station may alternatively encapsulate a to-be-sent data packet by using another protocol. For details, refer to the prior art. The details are not described in the disclosure.

As shown in FIG. 4, after the target base station receives the handover data message sent by the source base station, the target base station may decapsulate the data by using the physical layer protocol, the data link layer protocol, the IP protocol, SCTP, and the X2-AP interface protocol, to obtain the data packet that has not been acknowledged by the user equipment and that is sent by the source base station.

Certainly, the target base station may alternatively decapsulate the handover data message by using another protocol. For details, refer to the prior art. The details are not described in the disclosure.

In one embodiment, operation 304 and operation 305 may be simultaneously performed. In other words, the source base station may simultaneously send, to the target base station, the context information and the data packet that has not been acknowledged by the user equipment. Specifically, the source base station may send the status transfer signaling to the target base station, where the status transfer signaling includes the context information and the data packet that has not been acknowledged by the user.

Operation 306. The target base station maintains the TCP proxy for the user equipment based on the context information of the TCP proxy.

Figure 5:
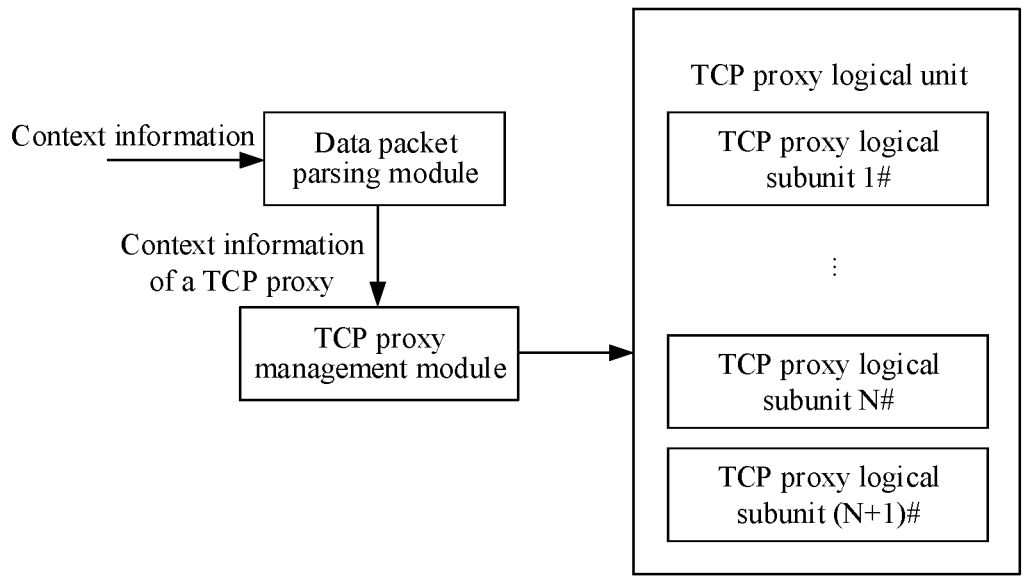
FIG. 5 is a schematic structural diagram of a TCP proxy on a target base station according to an embodiment of the disclosure.

FIG. 5 is a schematic structural diagram of a TCP proxy on a target base station. The TCP proxy on the target base station may include a data packet parsing module, a TCP proxy management module, and a TCP proxy logical unit. The TCP proxy logical unit may include a plurality of TCP proxy logical subunits, and each TCP service flow may correspond to one TCP proxy logical subunit in the TCP proxy logical unit. In FIG. 5, N #represents an $N^{th}$ TCP proxy logical subunit. The TCP proxy logical unit further includes a software template configured to generate the TCP proxy logical subunit, for example, a base-class software template. In this embodiment of the disclosure, the data packet parsing module may be configured to obtain the context information of the TCP proxy that is in the context information. The TCP proxy management module may be configured to obtain, based on the context information of the TCP proxy, a TCP proxy logical subunit corresponding to the context information of the TCP proxy. The TCP proxy logical subunit may be configured to process a data packet corresponding to the TCP service flow.

When the target base station maintains the TCP proxy function for the user equipment, the data packet parsing module of the TCP proxy on the target base station parses the context information of the TCP proxy that is in the context information, to obtain a source IP address, a source port, a destination IP address, and a destination port. Then, the data packet parsing module of the TCP proxy on the target base station inputs the obtained source IP address, source port, destination IP address, and destination port into the TCP proxy management module. The TCP proxy management module initializes the software template based on the source IP address, the source port, the destination IP address, and the destination port and generates a TCP proxy object, and then generates a corresponding TCP proxy logical subunit for the TCP proxy object. If the TCP proxy logical unit of the target base station includes N TCP proxy logical subunits before the user equipment is handed over between base stations, when the target base station maintains the TCP proxy function for the user equipment, the TCP proxy management module generates an $(N+1)^{th}$ TCP proxy logical subunit for a TCP service flow between the user equipment and the service server. After the user equipment is handed over between the base stations, the $(N+1)^{th}$ TCP proxy logical subunit in the TCP proxy logical unit of the target base station may send, to the user equipment, the data packet migrated from the source base station to the target base station, to ensure that the user equipment and the service server continue to perform a TCP connection; and may cache or forward a data packet of the TCP service flow between the user equipment and the service server.

Operation 307. The target base station sends a handover request response message to the source base station, where the handover request response message includes a second information element, and the second information element is used to indicate that the target base station is incapable of allocating the TCP proxy resource to the user equipment.

For example, a bit value 0 of the second information element may indicate that the target base station is incapable of allocating the TCP proxy resource to the user equipment.

Operation 308. The source base station sends status transfer signaling to the target base station, where the status transfer signaling includes context information, and the context information includes a sequence number of a data packet.

In other words, when determining that the target base station is incapable of allocating the TCP proxy resource to the user equipment, the source base station sends only the context information that includes the sequence number of the data packet.

Operation 309. The source base station migrates, by using SCTP, a data packet that has not been acknowledged by the user equipment to the target base station.

For a specific process, refer to operation 305.

In this way, in a TCP proxy handover scenario, the source base station may migrate, by negotiating with the target base station, the data packet that has not been acknowledged by the user equipment to the target base station, to ensure that the data packet of the user is not lost. In this embodiment of the disclosure, the source base station migrates, by using STCP, the data packet that has not been acknowledged by the user equipment to the target base station, so that it can be ensured that in the TCP proxy handover scenario, the data packet can be completely migrated from the source base station to the target base station, and a problem that a TCP connection is broken due to packet loss of the data packet in a TCP proxy handover process can be resolved. In addition, in this implementation of the disclosure, the source base station may further send the context information of the TCP proxy to the target base station, so that the target base station can continue to allocate the TCP proxy resource to the user based on the context information of the TCP proxy, to maintain continuity of the TCP proxy before and after handover; and can provide the proxy function for the user in an entire service period, thereby improving user experience.

Figure 6:
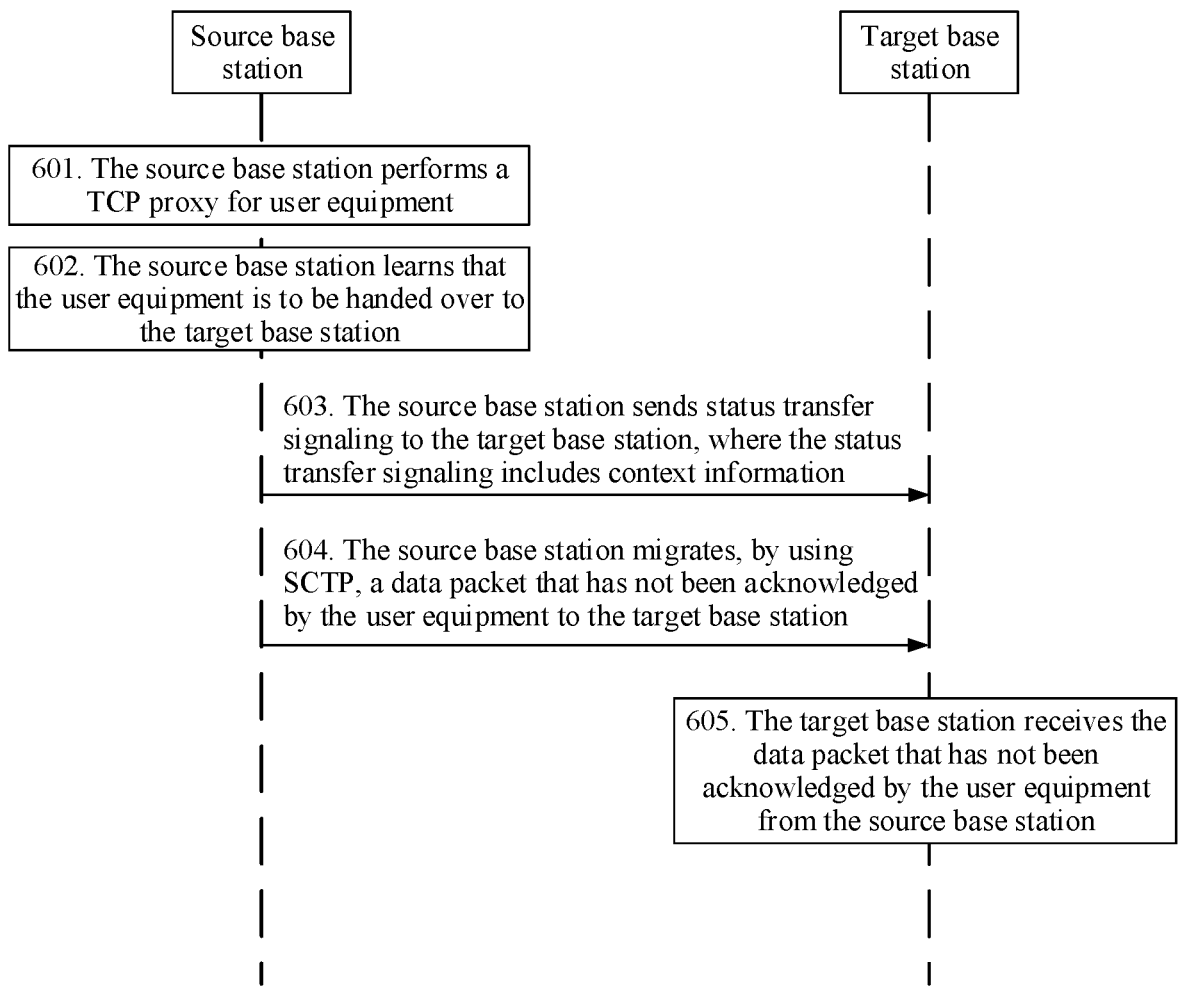
FIG. 6 is a schematic diagram of a data migration method according to an embodiment of the disclosure.

An embodiment of the disclosure provides a data migration method. As shown in FIG. 6, the method includes the following operations.

Operation 601. A source base station performs a TCP proxy for user equipment.

If the source base station performs the TCP proxy for the user equipment, when the user equipment and a service server perform data transmission with each other, the source base station may cache, by using the TCP proxy on the source base station, a data packet sent by the service server to the user equipment or a data packet sent by the user equipment to the service server.

Operation 602. The source base station learns that the user equipment is to be handed over to a target base station.

When performing the TCP proxy for the user equipment, the source base station receives a measurement report reported by the user equipment and learns, based on the measurement report, that the user equipment is to be handed over to the target base station, and then the source base station may send a handover request to the target base station through an X2 interface to request the target base station to prepare for handover.

Operation 603. The source base station sends status transfer signaling to the target base station, where the status transfer signaling includes context information.

The context information includes a sequence number of a data packet, and the sequence number of the data packet is a largest sequence number of data packets that have been acknowledged by the user equipment or a smallest sequence number of data packets that have not been acknowledged by the user equipment.

Operation 604. The source base station migrates, by using SCTP, a data packet that has not been acknowledged by the user equipment to the target base station.

For a specific process, refer to operation 305.

Operation 605. The target base station receives the data packet that has not been acknowledged by the user equipment from the source base station.

To be specific, the target base station decapsulates, by using the X2 interface application protocol and SCTP, a handover data message received from the source base station, to obtain the data packet that has not been acknowledged by the user equipment.

For a specific process, refer to operation 305. After receiving the data packet migrated by the source base station, the target base station may send the data packet to the user equipment, to ensure that the user equipment and the service server continue to perform a TCP connection.

In this way, in a TCP proxy handover scenario, after learning that the user equipment is to be handed over to the target base station, the source base station may send the context information to the target base station, and then migrate, by using SCTP for ensuring arrival of a data packet, the data packet that has not been acknowledged by the user equipment to the target base station, to ensure that the data packet of the user is not lost, so that a problem that a TCP connection is broken due to packet loss of the data packet in a handover process can be resolved.

The foregoing mainly describes, from a perspective of the source base station and a perspective of the target base station, the solutions provided in the embodiments of the disclosure. It may be understood that to implement the foregoing functions, the source base station and the target base station include corresponding hardware structures and/or software modules for performing functions. A person skilled in the art should be easily aware that algorithm operations described with reference to the embodiments disclosed in this specification can be implemented by hardware or a combination of hardware and computer software in the disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the disclosure.

In the embodiments of the disclosure, the source base station and the target base station may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the disclosure is an example, and is merely logical function division. There may be another division manner in actual implementation.

Figure 7:
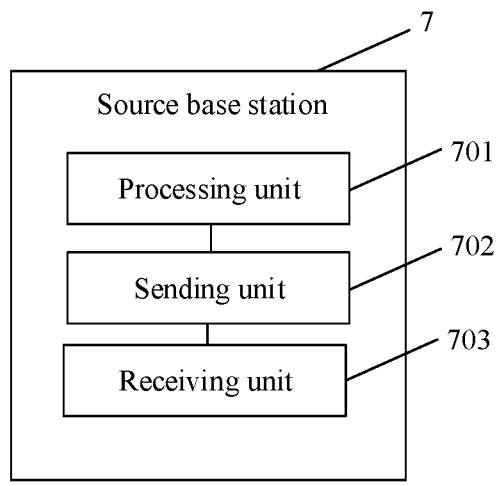
FIG. 7 is a schematic structural diagram of a source base station according to an embodiment of the disclosure.

When each function module is obtained through division based on each corresponding function, FIG. 7 is a possible schematic structural diagram of a source base station 7 in the foregoing embodiment. The source base station includes a processing unit 701, a sending unit 702, and a receiving unit 703. In this embodiment of the disclosure, the processing unit 701 may be configured to: perform a transmission control protocol TCP proxy for user equipment; and learn that the user equipment is to be handed over to a target base station. The sending unit 702 may be configured to: send context information to the target base station, where the context information includes a sequence number of a data packet, and the sequence number of the data packet is a largest sequence number of data packets that have been acknowledged by the user equipment or a smallest sequence number of data packets that have not been acknowledged by the user equipment; and migrate, by using the stream control transmission protocol SCTP, the data packets that have not been acknowledged by the user equipment to the target base station, so that the target base station receives, based on the sequence number of the data packet, the data packets that have not been acknowledged by the user equipment. The receiving unit 703 may be configured to receive a handover request response message from the target base station, where the handover request response message includes a second information element, and the second information element is used to indicate whether the target base station is capable of allocating a TCP proxy resource to the user equipment. In the method embodiments shown in FIG. 3 and FIG. 6, the processing unit 701 is configured to support the source base station in performing process 304 in FIG. 3 or processes 601 and 602 in FIG. 6. The sending unit 702 is configured to support the source base station in performing processes 301, 304, and 305 in FIG. 3, or performing processes 308 and 309 in FIG. 3, or performing processes 603 and 604 in FIG. 6. The receiving unit 703 is configured to support the source base station in performing process 303 or 307 in FIG. 3. All related content of the operations in the foregoing method embodiments may be cited in function descriptions of corresponding function modules. Details are not described herein again.

Figure 8:
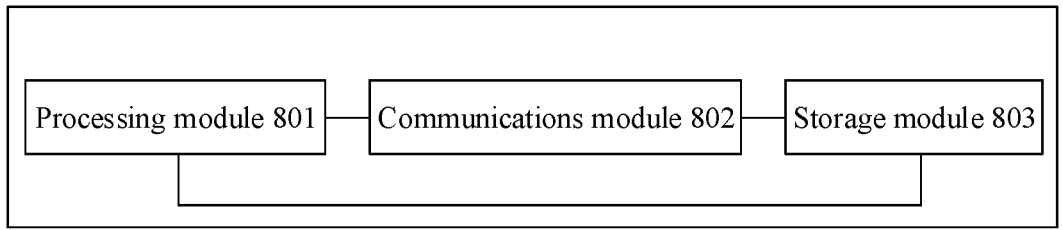
FIG. 8 is a schematic diagram of an internal structure of a source base station according to an embodiment of the disclosure.

When an integrated unit is used, FIG. 8 is a possible schematic structural diagram of a source base station in the foregoing embodiment. In the present disclosure, the source base station may include a processing module 801, a communications module 802, and a storage module 803. The processing module 801 is configured to control each hardware apparatus, application program software, and the like of the source base station. The communications module 802 is configured to: receive, in a communication manner such as wireless fidelity (WiFi), an instruction sent by another device, and send data of the source base station to the another device. The storage module 803 is configured to: store a software program of the source base station, store data, run software, and the like. The processing module 801 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 801 may implement or execute various example logical blocks, modules, and circuits described with reference to content disclosed in the present disclosure. Alternatively, the processor may be a combination of processors implementing a computing function, for example, a combination of one or more microprocessors or a combination of a DSP and a microprocessor. The communications module 802 may be a transceiver, a transceiver circuit, a communications interface, or the like. The storage module 803 may be a memory.

In this embodiment of the disclosure, the processing module 801 may be configured to determine whether a target base station is capable of allocating a TCP proxy resource to user equipment.

The communications module 802 may be configured to: when the processing module 801 determines that the target base station is capable of allocating the TCP proxy resource to the user equipment, send context information to the target base station, where the context information includes context information of establishing a TCP proxy and a sequence number of a data packet; or when the processing module 801 determines that the target base station is incapable of allocating the TCP proxy resource to the user equipment, send context information to the target base station, where the context information includes a sequence number of a data packet; and migrate a to-be-sent data packet to the target base station.

The storage module 803 may be configured to store the to-be-sent data packet in this embodiment of the disclosure.

Figure 9:
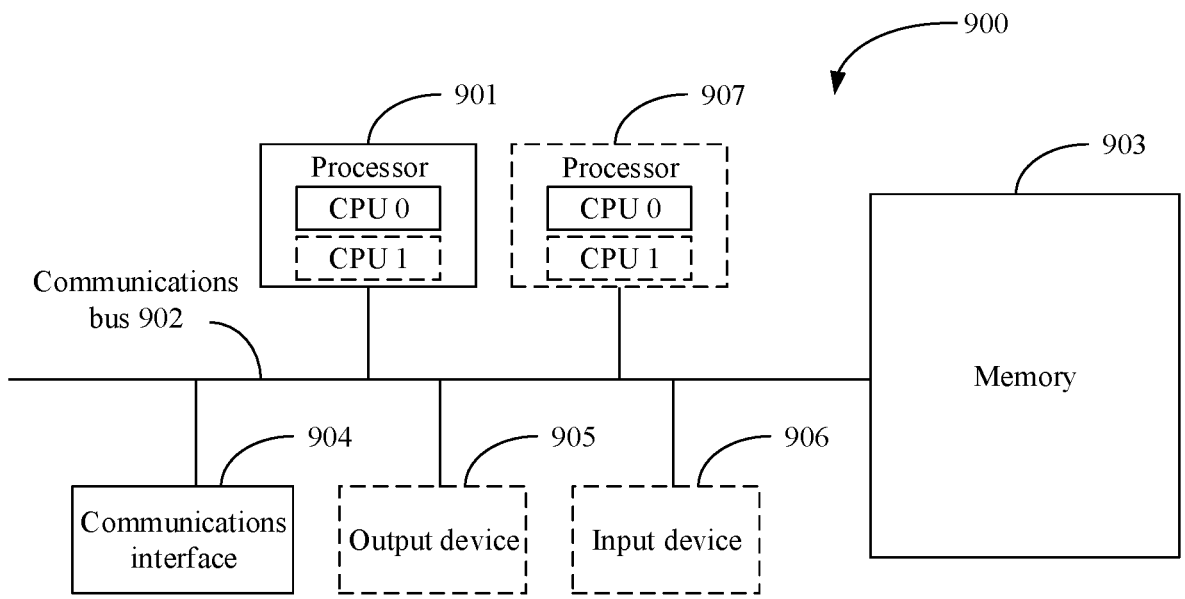
FIG. 9 is a schematic structural diagram of a source base station according to an embodiment of the disclosure.

In one embodiment, the source base station may be implemented by using a computer device (or a computer system) in FIG. 9.

FIG. 9 is a schematic diagram of a computer device according to an embodiment of the disclosure. The computer device 900 includes at least one processor 901, a communications bus 902, a memory 903, and at least one communications interface 904.

The processor 901 may be a general-purpose CPU, a microprocessor, an ASIC, or one or more integrated circuits configured to control program execution of the solutions in the disclosure.

The communications bus 902 may include a channel on which information is transmitted between the foregoing components.

The communications interface 904 is any apparatus such as a transceiver, to communicate with another device or communications network such as the Ethernet, a radio access network (RAN), or a wireless local area network (WLAN).

The memory 903 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 903 is not limited thereto. The memory may exist independently, and is connected to the processor by using a bus. Alternatively, the memory may be integrated into the processor.

The memory 903 is configured to store application program code for performing the solutions in the disclosure, and the application program code is executed under control of the processor 901. The processor 901 is configured to execute the application program code stored in the memory 903, to implement a function in the method in the patent.

In specific implementation, in an embodiment, the processor 901 may include one or more CPUs, for example, a CPU 0 and a CPU 1 in FIG. 9.

In specific implementation, in an embodiment, the computer device 900 may include a plurality of processors, for example, a processor 901 and a processor 907 in FIG. 9. Each of these processors may be a single-core (single-CPU) processor, or may be a multi-core (multi-CPU) processor. The processor herein may be one or more devices, circuits, and/or processing cores configured to process data (for example, a computer program instruction).

In specific implementation, in an embodiment, the computer device 900 may further include an output device 905 and an input device 906. The output device 905 communicates with the processor 901, and may display information in a plurality of manners. For example, the output device 905 may be a liquid crystal display (LCD), a light emitting diode (LED) display device, a cathode-ray tube (CRT) display device, or a projector. The input device 906 communicates with the processor 901, and may receive input of a user in a plurality of manners. For example, the input device 906 may be a mouse, a keyboard, a touchscreen device, or a sensing device.

The computer device 900 may be a general-purpose computer device or a dedicated computer device. In specific implementation, the computer device 900 may be a desktop computer, a portable computer, a network server, a personal digital assistant (PDA), a mobile phone, a tablet computer, a wireless terminal device, a communications device, an embedded device, or a device having a structure similar to that in FIG. 9. A type of the computer device 900 is not limited in this embodiment of the disclosure.

The following describes this embodiment of the disclosure with reference to FIG. 9. To be specific, if the source base station performs a transmission control protocol TCP proxy for user equipment, when determining that the user equipment is handed over between base stations, the processor 901 of the source base station determines whether a target base station is capable of allocating a TCP proxy resource to the user equipment. If the processor 901 of the source base station determines that the target base station is capable of allocating the TCP proxy resource to the user equipment, the processor of the source base station sends context information to the target base station by using the communications interface 904, where the context information includes context information of establishing the TCP proxy and a sequence number of a data packet. The communications interface 904 of the source base station migrates a to-be-sent data packet to the target base station, so that the target base station receives the to-be-sent data packet based on the sequence number of the data packet, and maintains the TCP proxy for the user equipment based on the context information of the TCP proxy.

In this way, when the source base station performs the TCP proxy for the user equipment, if the user equipment is handed over between the base stations, the source base station may send the context information to the target base station, so that the target base station receives the to-be-sent data packet based on the context information, and maintains the TCP proxy function for the user equipment. Compared with the prior art in which during handover of a TCP proxy, a TCP connection between a server and user equipment is broken due to packet loss on the server side, in this embodiment of the disclosure, the source base station may migrate a data packet to the target base station to avoid packet loss of the data packet, thereby resolving a problem that a TCP connection is broken due to the packet loss.

Figure 10:
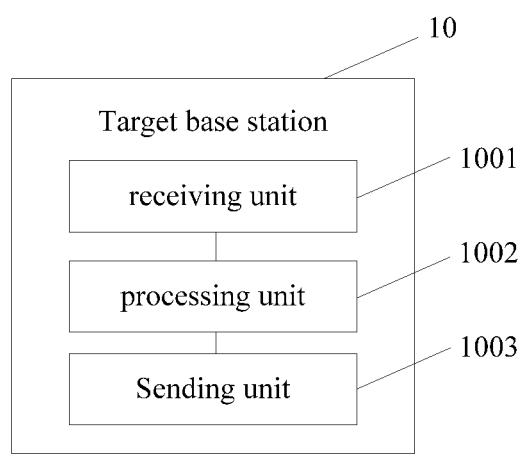
FIG. 10 is a schematic structural diagram of a target base station according to an embodiment of the disclosure.

When each function module is obtained through division based on each corresponding function, FIG. 10 is a possible schematic structural diagram of a target base station 10 in the foregoing embodiment. The target base station includes a receiving unit 1001, a processing unit 1002, and a sending unit 1003. In this embodiment of the disclosure, the receiving unit 1001 may be configured to receive context information from a source base station, where the context information includes a sequence number of a data packet, and the sequence number of the data packet is a largest sequence number of data packets that have been acknowledged by user equipment or a smallest sequence number of data packets that have not been acknowledged by the user equipment. The processing unit 1002 may be configured to receive, from the source base station based on the sequence number of the data packet by using the receiving unit, the data packets that have not been acknowledged by the user equipment and that are migrated by using the stream control transmission protocol SCTP. The sending unit 1003 may be configured to send a handover request response message to the source base station, where the handover request response message includes a second information element, and the second information element is used to indicate whether the target base station is capable of allocating a TCP proxy resource to the user equipment. In the method embodiments shown in FIG. 3 and FIG. 6, the receiving unit 1001 is configured to support the target base station in performing processes 301, 304, and 305 in FIG. 3, or performing processes 308 and 309 in FIG. 3, or performing processes 603 and 604 in FIG. 6. The processing unit 1002 is configured to support the target base station in performing processes 302 and 306 in FIG. 3, or performing process 605 in FIG. 6. The sending unit 1003 is configured to support the target base station in performing process 303 or 307 in FIG. 3. All related content of the operations in the foregoing method embodiments may be cited in function descriptions of corresponding function modules. Details are not described herein again.

Figure 11:
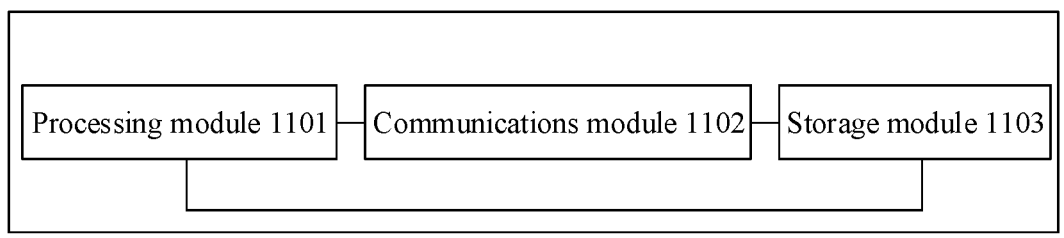
FIG. 11 is a schematic diagram of an internal structure of a target base station according to an embodiment of the disclosure.

When an integrated unit is used, FIG. 11 is a possible schematic structural diagram of a target base station in the foregoing embodiment. In the present disclosure, the target base station may include a processing module 1101, a communications module 1102, and a storage module 1103. The processing module 1101 is configured to control each hardware apparatus, application program software, and the like of the target base station. The communications module 1102 is configured to: receive, in a communication manner such as WiFi, an instruction sent by another device, and send data of the target base station to the another device. The storage module 1103 is configured to: store a software program of the target base station, store data, run software, and the like. The processing module 1101 may be a processor or a controller, for example, may be a CPU, a general purpose processor, a DSP, an ASIC, an FPGA or another programmable logic device, a transistor logic device, a hardware component, or any combination thereof. The processing module 1101 may implement or execute various example logical blocks, modules, and circuits described with reference to content disclosed in the disclosure. Alternatively, the processor may be a combination of processors implementing a computing function, for example, a combination of one or more microprocessors or a combination of a DSP and a microprocessor. The communications module 1102 may be a transceiver, a transceiver circuit, a communications interface, or the like. The storage module 1103 may be a memory.

In this embodiment of the disclosure, the processing module 1101 may be configured to determine whether the target base station is capable of allocating a TCP proxy resource to user equipment.

The communications module 1102 may be configured to: when the processing module 1101 determines that the target base station is capable of allocating the TCP proxy resource to the user equipment, receive context information sent by a source base station, where the context information includes context information of establishing a TCP proxy and a sequence number of a data packet; or when the processing module 1101 determines that the target base station is incapable of allocating the TCP proxy resource to the user equipment, receive context information sent by a source base station, where the context information includes a sequence number of a data packet; and receive a to-be-sent data packet migrated by the source base station.

The storage module 1103 may be configured to store the to-be-sent data packet in this embodiment of the disclosure.

Figure 12:
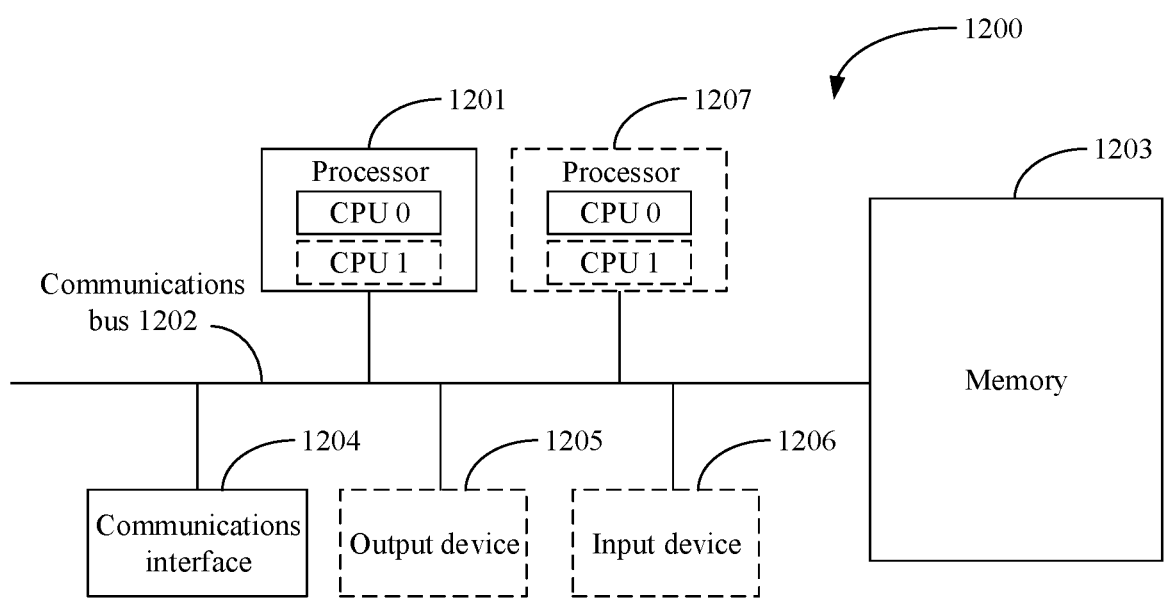
FIG. 12 is a schematic structural diagram of a target base station according to an embodiment of the disclosure.

In one embodiment, the target base station may be implemented by using a computer device (or a computer system) in FIG. 12.

FIG. 12 is a schematic diagram of a computer device according to an embodiment of the present disclosure. The computer device 1200 includes at least one processor 1201, a communications bus 1202, a memory 1203, and at least one communications interface 1204.

The processor 1201 may be a CPU, a microprocessor, an ASIC, or one or more integrated circuits configured to control program execution of the solutions in the present disclosure.

The communications bus 1202 may include a channel on which information is transmitted between the foregoing components.

The communications interface 1204 is any apparatus such as a transceiver, to communicate with another device or communications network such as the Ethernet, a RAN, or a WLAN.

The memory 1203 may be a ROM or another type of static storage device that can store static information and instructions, or a RAM or another type of dynamic storage device that can store information and instructions, or may be an EEPROM, a CD-ROM or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 1203 is not limited thereto. The memory may exist independently, and is connected to the processor by using a bus. Alternatively, the memory may be integrated into the processor.

The memory 1203 is configured to store application program code for performing the solutions in the present disclosure, and the application program code is executed under control of the processor 1201. The processor 1201 is configured to execute the application program code stored in the memory 1203, to implement a function in the method in the patent.

In specific implementation, in an embodiment, the processor 1201 may include one or more CPUs, for example, a CPU 0 and a CPU 1 in FIG. 12.

In specific implementation, in an embodiment, the computer device 1200 may include a plurality of processors, for example, a processor 1201 and a processor 1207 in FIG. 12. Each of these processors may be a single-core processor, or may be a multi-core processor. The processor herein may be one or more devices, circuits, and/or processing cores configured to process data (for example, a computer program instruction).

In specific implementation, in an embodiment, the computer device 1200 may further include an output device 1205 and an input device 1206. The output device 1205 communicates with the processor 1201, and may display information in a plurality of manners. For example, the output device 1205 may be an LCD, an LED display device, a CRT display device, or a projector. The input device 1206 communicates with the processor 1201, and may receive input of a user in a plurality of manners. For example, the input device 1206 may be a mouse, a keyboard, a touchscreen device, or a sensing device.

The computer device 1200 may be a general-purpose computer device or a dedicated computer device. In specific implementation, the computer device 1200 may be a desktop computer, a portable computer, a network server, a PDA, a mobile phone, a tablet computer, a wireless terminal device, a communications device, an embedded device, or a device having a structure similar to that in FIG. 12. A type of the computer device 1200 is not limited in this embodiment of the present disclosure.

The following describes this embodiment of the disclosure with reference to FIG. 12. To be specific, the processor 1201 of the target base station determines whether the target base station is capable of allocating a TCP proxy resource to user equipment. If the processor 1201 of the target base station determines that the target base station is capable of allocating the TCP proxy resource to the user equipment, the communications interface 1204 of the target base station receives context information sent by a source base station, where the context information includes context information of establishing a TCP proxy and a sequence number of a data packet. The processor 1201 of the target base station receives, based on the sequence number of the data packet by using the communications interface 1204, a to-be-sent data packet migrated by the source base station, and maintains the TCP proxy for the user equipment based on the context information of the TCP proxy.

In this way, if the target base station determines that the target base station is capable of allocating the TCP proxy resource to the user equipment, the target base station may receive the context information sent by the source base station, and may receive, based on the context information, the to-be-sent data packet migrated by the source base station and maintain the TCP proxy function for the user equipment. Compared with the prior art in which during handover of a TCP proxy, a TCP connection between a server and user equipment is broken due to packet loss on the server side, in this embodiment of the disclosure, the target base station may receive a data packet migrated by the source base station to avoid packet loss of the data packet, thereby resolving a problem that a TCP connection is broken due to the packet loss. In addition, in this embodiment of the disclosure, the target base station may further maintain the TCP proxy for the user equipment based on the context information, thereby improving user experience.

Methods or algorithm operations described with reference to content disclosed in the disclosure may be implemented by hardware, or may be implemented by a processor executing a software instruction. The software instruction may include a corresponding software module. The software module may be stored in a RAM, a flash memory, a ROM, an EPROM, an EEPROM, a register, a hard disk, a removable hard disk, a compact disc read-only memory, or any other form of storage medium well-known in the art. For example, a storage medium is coupled to a processor, so that the processor can read information from the storage medium and can write the information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist in the core network interface device as discrete components.

A person skilled in the art should be aware that in the foregoing one or more examples, functions described in the disclosure may be implemented by hardware, software, firmware, or any combination thereof. When these functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium that can be accessed by a general-purpose computer or a dedicated computer.

The objectives, technical solutions, and beneficial effects of the disclosure are further described in detail in the foregoing specific implementations. It should be understood that the foregoing descriptions are merely specific implementations of the disclosure, but are not intended to limit the protection scope of the disclosure. Any modification, equivalent replacement, improvement, or the like made based on the technical solutions of the disclosure shall fall within the protection scope of the disclosure.

What is claimed is:

1. A data migration method, comprising:
   performing, by a source base station, a transmission control protocol (TCP) proxy for user equipment;
   learning, by the source base station, that the user equipment is to be handed over to a target base station;
   sending, by the source base station, context information to the target base station, wherein the context information comprises a sequence number of a data packet, and the sequence number of the data packet is a largest sequence number of data packets that have been acknowledged by the user equipment or a smallest sequence number of data packets that have not been acknowledged by the user equipment; and
   migrating, by the source base station by using a stream control transmission protocol (SCTP), the data packets that have not been acknowledged by the user equipment to the target base station, so that the target base station receives, based on the sequence number of the data packet, the data packets that have not been acknowledged by the user equipment, including
   encapsulating, by the source base station by using an X2 interface application protocol and the SCTP, the data packets that have not been acknowledged by the user equipment, and
   sending, by the source base station, a handover data message to the target base station, wherein the handover data message comprises the data packets that have not been acknowledged by the user equipment and a message type indication that are encapsulated by the source base station by using the X2 interface application protocol and the SCTP, and the message type indication is used to indicate that the source base station migrates the data packets that have not been acknowledged by the user equipment to the target base station.

2. The method according to claim 1, further comprising:
sending, by the source base station, a handover request to the target base station, wherein the handover request comprises a first information element, and the first information element is used to indicate that the source base station performs the TCP proxy for the user equipment; and
receiving, by the source base station, a handover request response message from the target base station, wherein the handover request response message comprises a second information element, and the second information element is used to indicate whether the target base station is capable of allocating a TCP proxy resource to the user equipment.

3. The method according to claim 2, wherein
if the second information element indicates that the target base station is capable of allocating the TCP proxy resource to the user equipment, the context information further comprises context information of establishing the TCP proxy, so that the target base station maintains the TCP proxy for the user equipment based on the context information of the TCP proxy.

4. The method according to claim 2, wherein the sending, by the source base station, context information to the target base station comprises:
sending, by the source base station, status transfer signaling to the target base station, wherein the status transfer signaling comprises the context information.

5. A data migration method, comprising:
receiving, by a target base station, context information from a source base station, wherein the context information comprises a sequence number of a data packet, and the sequence number of the data packet is a largest sequence number of data packets that have been acknowledged by user equipment or a smallest sequence number of data packets that have not been acknowledged by the user equipment; and
receiving, by the target base station, from the source base station based on the sequence number of the data packet, the data packets that have not been acknowledged by the user equipment and that are migrated by using a stream control transmission protocol (SCTP), including:
receiving, by the target base station, a handover data message from the source base station, wherein the handover data message comprises the data packets that have not been acknowledged by the user equipment and a message type indication, and the message type indication is used to indicate that the target base station receives the data packets that have not been acknowledged by the user equipment from the source base station, and
decapsulating, by the target base station, the handover data message by using an X2 interface application protocol and the SCTP, to obtain the data packets that have not been acknowledged by the user equipment.

6. The method according to claim 5, further comprising:
receiving, by the target base station, a handover request from the source base station, wherein the handover request comprises a first information element, and the first information element is used to indicate that the source base station performs a TCP proxy for the user equipment;
determining, by the target base station based on a capability of the target base station, whether the target base station can maintain the TCP proxy for the user equipment; and sending, by the target base station, a handover request response message to the source base station, wherein the handover request response message comprises a second information element, and the second information element is used to indicate whether the target base station is capable of allocating a TCP proxy resource to the user equipment.

7. The method according to claim 6, wherein
if the second information element indicates that the target base station is capable of allocating the TCP proxy resource to the user equipment, the context information further comprises context information of establishing the TCP proxy; and
the target base station maintains the TCP proxy for the user equipment based on the context information of the TCP proxy.

8. The method according to claim 7, wherein the receiving, by a target base station, context information from a source base station comprises:
receiving, by the target base station, status transfer signaling from the source base station, wherein the status transfer signaling comprises the context information.

9. A source base station, comprising:
a processor, configured to perform a transmission control protocol (TCP) proxy for user equipment, wherein
the processor is further configured to learn that the user equipment is to be handed over to a target base station; and
encapsulate, by using an X2 interface application protocol and a stream control transmission protocol (SCTP), data packets that have not been acknowledged by the user equipment; and
a transceiver, configured to send context information to the target base station, wherein the context information comprises a sequence number of a data packet, and the sequence number of the data packet is a largest sequence number of data packets that have been acknowledged by the user equipment or a smallest sequence number of data packets that have not been acknowledged by the user equipment, wherein
the transceiver is further configured to migrate, by using the SCTP, the data packets that have not been acknowledged by the user equipment to the target base station, so that the target base station receives, based on the sequence number of the data packet, the data packets that have not been acknowledged by the user equipment; and
send a handover data message to the target base station, wherein the handover data message comprises the data packets that have not been acknowledged by the user equipment and a message type indication that are encapsulated by the source base station by using the X2 interface application protocol and the SCTP, and the message type indication is used to indicate that the source base station migrates the data packets that have not been acknowledged by the user equipment to the target base station.

10. The source base station according to claim 9, wherein the transceiver is further configured to:
send a handover request to the target base station, wherein the handover request comprises a first information element, and the first information element is used to indicate that the source base station performs the TCP proxy for the user equipment; and
receive a handover request response message from the target base station, wherein the handover request response message comprises a second information element, and the second information element is used to indicate whether the target base station is capable of allocating a TCP proxy resource to the user equipment.

11. The source base station according to claim 10, wherein if the second information element indicates that the target base station is capable of allocating the TCP proxy resource to the user equipment, the context information further comprises context information of establishing the TCP proxy, so that the target base station maintains the TCP proxy for the user equipment based on the context information of the TCP proxy.

12. The source base station according to claim 10, wherein the transceiver is configured to:
send status transfer signaling to the target base station, wherein the status transfer signaling comprises the context information.

* * * * *